United States Patent
Thomas et al.

(10) Patent No.: US 9,449,168 B2
(45) Date of Patent: *Sep. 20, 2016

(54) METHOD AND SYSTEM FOR TRACKING MACHINES ON A NETWORK USING FUZZY GUID TECHNOLOGY

(71) Applicant: ThreatMETRIX PTY LTD, Chatswood NSW (AU)

(72) Inventors: Scott Thomas, Rockhampton North (AU); David G. Jones, Crescent Forestville (AU)

(73) Assignee: THREATMETRIX PTY LTD, Chatswood NSW (AU)

( * ) Notice: Subject to any disclaimer, the term of this patent is extended or adjusted under 35 U.S.C. 154(b) by 0 days.

This patent is subject to a terminal disclaimer.

(21) Appl. No.: 14/298,823

(22) Filed: Jun. 6, 2014

(65) Prior Publication Data
US 2015/0074804 A1    Mar. 12, 2015

Related U.S. Application Data

(63) Continuation of application No. 13/372,480, filed on Feb. 13, 2012, now Pat. No. 8,782,783, which is a continuation of application No. 11/550,395, filed on Oct. 17, 2006, now Pat. No. 8,141,148.

(60) Provisional application No. 60/838,230, filed on Aug. 16, 2006.

(51) Int. Cl.
*G06F 21/00* (2013.01)
*G06F 21/50* (2013.01)
(Continued)

(52) U.S. Cl.
CPC ............... *G06F 21/50* (2013.01); *G06F 21/00* (2013.01); *H04L 29/06877* (2013.01);
(Continued)

(58) Field of Classification Search
CPC .............. G06F 21/50; G06F 2201/86; G06F 2201/87; H04L 63/00
USPC ................................ 726/22–25; 709/217–229
See application file for complete search history.

(56) References Cited

U.S. PATENT DOCUMENTS 6,496,824 B1    12/2002  Wilf
6,714,970 B1     3/2004  Fiveash et al.
(Continued)

OTHER PUBLICATIONS

Non-Final Office Action for U.S. Appl. No. 11/550,395 (Aug. 27, 2009) 19 pages.
(Continued)

*Primary Examiner* — Madhuri Herzog
(74) *Attorney, Agent, or Firm* — Alston & Bird LLP (57) ABSTRACT

A method for querying a knowledgebase of malicious hosts numbered from 1 through N. The method includes providing a network of computers, which has a plurality of unknown malicious host machines. In a specific embodiment, the malicious host machines are disposed throughout the network of computers, which includes a worldwide network of computers, e.g., Internet. The method includes querying a knowledge base including a plurality of known malicious hosts, which are numbered from 1 through N, where N is an integer greater than 1. In a preferred embodiment, the knowledge base is coupled to the network of computers. The method includes receiving first information associated with an unknown host from the network; identifying an unknown host and querying the knowledge base to determine if the unknown host is one of the known malicious hosts in the knowledge base. The method also includes outputting second information associated with the unknown host based upon the querying process.

20 Claims, 7 Drawing Sheets

(51) Int. Cl.
*H04L 29/06* (2006.01)
*G06F 21/55* (2013.01)

(52) U.S. Cl.
CPC ........ *H04L 29/06911* (2013.01); *H04L 63/14* (2013.01); *H04L 63/1408* (2013.01); *G06F 21/55* (2013.01); *G06F 2201/86* (2013.01); *G06F 2221/2127* (2013.01); *H04L 29/06884* (2013.01); *H04L 63/0236* (2013.01); *H04L 63/0876* (2013.01); *H04L 2463/146* (2013.01)

(56) References Cited

U.S. PATENT DOCUMENTS

| | | |
|---|---|---|
| 7,177,917 B2 | 2/2007 | Giotta |
| 7,398,310 B1 | 7/2008 | Kuehl et al. |
| 7,454,790 B2 | 11/2008 | Potok et al. |
| 7,461,120 B1 | 12/2008 | Artz, Jr. et al. |
| 7,533,265 B2 | 5/2009 | Ballinger et al. |
| 7,545,748 B1 | 6/2009 | Riddle |
| 7,624,274 B1 | 11/2009 | Alspector et al. |
| 7,712,134 B1 | 5/2010 | Nucci et al. |
| 7,908,645 B2 | 3/2011 | Varghese et al. |
| 7,937,336 B1 | 5/2011 | Maynard-Zhang et al. |
| 8,141,148 B2 | 3/2012 | Thomas et al. |
| 8,151,327 B2 | 4/2012 | Eisen et al. |
| 8,176,178 B2 | 5/2012 | Thomas et al. |
| 8,844,038 B2 | 9/2014 | Niemela |
| 2002/0066034 A1 | 5/2002 | Schlossberg et al. |
| 2002/0138582 A1 | 9/2002 | Chandra et al. |
| 2003/0140068 A1 | 7/2003 | Yeung |
| 2003/0188189 A1 | 10/2003 | Desai et al. |
| 2003/0223367 A1 | 12/2003 | Shay et al. |
| 2004/0047324 A1 | 3/2004 | Diener |
| 2005/0076230 A1 | 4/2005 | Redenbaugh et al. |
| 2005/0081059 A1 | 4/2005 | Bandini et al. |
| 2005/0187935 A1 | 8/2005 | Kumar |
| 2005/0210027 A1 | 9/2005 | Aggarwal et al. |
| 2006/0070128 A1 | 3/2006 | Heimerdinger et al. |
| 2006/0080657 A1 | 4/2006 | Goodman |
| 2006/0149708 A1 | 7/2006 | Lavine |
| 2006/0212942 A1 | 9/2006 | Barford et al. |
| 2006/0265748 A1* | 11/2006 | Potok .............................. 726/23 |
| 2007/0011744 A1 | 1/2007 | Carothers et al. |
| 2007/0124801 A1 | 5/2007 | Thomas et al. |
| 2007/0214151 A1 | 9/2007 | Thomas et al. |
| 2008/0033794 A1 | 2/2008 | Ou et al. |
| 2008/0047009 A1 | 2/2008 | Overcash et al. |
| 2008/0244744 A1 | 10/2008 | Thomas et al. |
| 2011/0131652 A1 | 6/2011 | Robinson et al. |
| 2011/0302653 A1 | 12/2011 | Frantz et al. |
| 2011/0305160 A1 | 12/2011 | Green et al. |
| 2013/0055388 A1 | 2/2013 | Thomas et al. |
| 2015/0007253 A1 | 1/2015 | Thomas et al. |
| 2015/0074804 A1 | 3/2015 | Thomas et al. |

OTHER PUBLICATIONS

Final Office Action for U.S. Appl. No. 11/550,395 (Mar. 24, 2010) 19 pages.
Non-Final Office Action for U.S. Appl. No. 11/550,395 (May 9, 2011) 36 pages.
Notice of Allowance for U.S. Appl. No. 11/550,395 (Dec. 7, 2011) 5 pages.
Non-Final Office Action for U.S. Appl. No. 13/372,480 (Jul. 10, 2013) 32 pages.
Notice of Allowance for U.S. Appl. No. 13/372,480 (Mar. 6, 2014) 10 pages.
Requirement for Restriction/Election for U.S. Appl. No. 12/022,022, mailed on May 9, 2011.
Notice of Allowance for U.S. Appl. No. 12/022,022, mailed on Feb. 29, 2012.
Notice of Allowance for U.S. Appl. No. 12/022,022, mailed on Jan. 9, 2012.
Notice of Allowance for U.S. Appl. No. 12/022,022, mailed on Feb. 15, 2012.
Final Office Action for U.S. Appl. No. 12/196,256; mailed on Nov. 13, 2012.
Non-Final Office Action for U.S. Appl. No. 11/550,393 (Oct. 6, 2009).
Final Office Action for U.S. Appl. No. 11/550,393 (Jul. 12, 2010).
Non-Final Office Action for U.S. Appl. No. 11/550,393 (Mar. 3, 2011).
Final Office Action for U.S. Appl. No. 11/550,393 (Aug. 19, 2011).
Non-Final Office Action for U.S. Appl. No. 11/550,393 (Apr. 16, 2013).
Notice of Allowance for U.S. Appl. No. 11/550,393 (Feb. 13, 2014).
Notice of Allowance for U.S. Appl. No. 13/442,857, mailed on Apr. 23, 2014.
Advisory Action for U.S. Appl. No. 11/550,393 (Oct. 6, 2010).
Advisory Action for U.S. Appl. No. 11/550,393 (Dec. 1, 2011).
Non-Final Office Action for U.S. Appl. No. 14/281,887 (Oct. 29, 2015).
Advisory Action for U.S. Appl. No. 11/550,395 (Sep. 7, 2010).
Requirement for Restriction/Election for U.S. Appl. No. 14/455,874, mailed on Jul. 14, 2015.
Non-Final Office Action for U.S. Appl. No. 14/455,874 (Jan. 13, 2016).
Non-Final Office Action for U.S. Appl. No. 12/196,256 (Apr. 22, 2011).
Non-Final Office Action for U.S. Appl. No. 12/196,256 (Jul. 16, 2013).
Final Office Action for U.S. Appl. No. 12/196,256 (Jun. 27, 2014).
Non-Final Office Action for U.S. Appl. No. 12/196,256 (Oct. 23, 2014).
Final Office Action for U.S. Appl. No. 12/196,256 (Aug. 7, 2015).
Notice of Allowance for U.S. Appl. No. 12/196,256 (Feb. 26, 2016).

\* cited by examiner

METHOD AND SYSTEM FOR TRACKING MACHINES ON A NETWORK USING FUZZY GUID TECHNOLOGY

CROSS-REFERENCES TO RELATED APPLICATIONS

This application is a continuation application of U.S. patent application Ser. No. 13/372,480, titled "A METHOD AND SYSTEM FOR TRACKING MACHINES ON A NETWORK USING FUZZY GUID TECHNOLOGY" by Scott Thomas and David G. Jones, filed Feb. 13, 2012, which is a continuation application of U.S. patent application Ser. No. 11/550,395, titled "A METHOD AND SYSTEM FOR TRACKING MACHINES ON A NETWORK USING FUZZY GUID TECHNOLOGY" by Scott Thomas and David G. Jones, filed Oct. 17, 2006, which claims priority to provisional patent application Ser. No. US 60/838,230, titled "A METHOD AND SYSTEM FOR TRACKING MACHINES ON A NETWORK USING FUZZY GUID TECHNOLOGY" by Scott Thomas and David G. Jones, filed Aug. 16, 2006. This application is also related to provisional patent application Ser. No. US 60/740,585, titled "METHOD AND SYSTEM FOR PROCESSING A STREAM OF INFORMATION FROM A COMPUTER NETWORK USING NODE BASED REPUTATION CHARACTERISTICS" by David G. Jones, filed Nov. 28, 2006. Both provisional applications are incorporated by reference in their entirety.

COPYRIGHT NOTICE

All content included such as text, graphics, logos, button icons, images, audio clips, digital downloads, data compilations, and software, is the property of its supplier and protected by United States and international copyright laws. The compilation of all content is protected by U.S. and international copyright laws. Copyright© 2006 ThreatME-TRIX PTY LTD. All rights reserved.

BACKGROUND OF THE INVENTION

The present invention generally relates to knowledge based techniques. More particularly, the invention provides a method and system for tracking machines on a network using fuzzy GUID (Globally Unique Identifier) technology in a knowledge base. Merely by way of example, the invention has been applied to a computer network environment. But it would be recognized that the invention has a much broader range of applicability. For example, the invention can be applied to a firewall, an intrusion detection/prevention system, a server, a content filter device, an anti-virus process, an anti-SPAM device, a web proxy content filter, spyware, web security process, electronic mail filter, any combination of these, and others.

Telecommunication techniques have been around for numerous years. In the early days, telegraph generally transferred information from one geographical location to another geographical location using electrical signals in the form of "dots" and "dashes" over transmission lines. An example of commonly used electrical signals is Morse code. Telegraph has been, for the most part, replaced by telephone. The telephone was invented by Alexander Graham Bell in the 1800s to transmit and send voice information using electrical analog signals over a telephone line, or more commonly a single twisted pair copper line. Most industrialized countries today rely heavily upon telephone to facilitate communication between businesses and people, in general.

In the 1990s, another significant development in the telecommunication industry occurred. People began communicating to each other by way of computers, which are coupled to the telephone lines or telephone network. These computers or workstations coupled to each other can transmit many types of information from one geographical location to another geographical location. This information can be in the form of voice, video, and data, which have been commonly termed as "multimedia." Information transmitted over the Internet or Internet "traffic" has increased dramatically in recent years. Information is now transmitted through networks, wide-area networks, telephone systems, and the Internet. This results in rapid transfer of information such as computer data, voice or other multimedia information.

Although the telecommunication industry has achieved major successes, certain drawbacks have also grown with wide spread communication networks. As merely an example, negative effects include an actor (initiator) connecting to another actor (acceptor) in a manner not acceptable to the acceptor. The inability for the acceptor to assess the risk of allowing connection from any initiator means is a problem for efficient resource management and protection of assets. Other drawbacks also exist.

As the size and speed of these networks increase, similar growth of malicious events using telecommunications techniques: stalking, cyber-stalking, harassment, hacking, spam, computer-virus outbreaks, Denial of Service attacks, extortion, fraudulent behaviors (e.g., such as fraudulent websites, scams, 419 spam, so-called phishing) have also continued to increase. This increase is largely due to the anonymous methods that can be used over a network to obscure the initiator's identity, location and disposition. Additionally, it is often difficult to determine an identity of a malicious host. These and other limitations are described throughout the present specification and more particularly below.

From the above, it is seen that a technique for improving security over a wide area network is highly desirable.

SUMMARY OF THE INVENTION

The present invention generally relates to knowledge based techniques. More particularly, the invention provides a method and system for tracking machines on a network using fuzzy GUID (Globally Unique Identifier) technology in a knowledge base. Merely by way of example, the invention has been applied to a computer network environment. But it would be recognized that the invention has a much broader range of applicability. For example, the invention can be applied to a firewall, an intrusion detection/prevention system, a server, a content filter device, an anti-virus process, an anti-SPAM device, a web proxy content filter, spyware, web security process, electronic mail filter, any combination of these, and others.

In a specific embodiment, the present invention provides a method tracking machines on a network of computers, e.g., local area network, wide area network, world wide area network. The method includes identifying a malicious host coupled to the network of computers and determining a first IP address and one or more attributes associated with the malicious host during a first time period. As used herein, the term "malicious host" should be construed by ordinary meaning to one of ordinary skill in the art. The method includes classifying the malicious host to be in a determined state. The method includes changing the first IP address to a second IP address during a second time period to cause the malicious host to be in a latent state. That is, the malicious host, which is known, becomes latent. In a specific embodiment, the method includes identifying an unknown host during the second time period. In a preferred embodiment, the unknown host is associated with the second IP address and one or more attributes. That is, the known malicious host, which becomes latent, may begin using a different IP address to "mask" or "hide" the known malicious host. The method includes processing the second IP address and the one or more attributes of the unknown host with the first IP address and the one or more attributes of the malicious host and determining if the unknown host is the malicious host. Alternatively, the method determines if the unknown host is a different machine from one or more malicious hosts, which may be identified in a knowledge base.

In an alternative specific embodiment, the present invention provides a method for querying a knowledgebase of malicious hosts numbered from 1 through N. The method includes providing a network of computers, which has a plurality of unknown malicious host machines. In a specific embodiment, the malicious host machines are disposed throughout the network of computers, which includes a world wide network of computers, e.g., Internet. The method includes querying a knowledge base including a plurality of known malicious hosts, which are numbered from 1 through N, where N is an integer greater than 1. In a preferred embodiment, the knowledge base is coupled to the network of computers. The method includes receiving first information associated with an unknown host from the network; identifying an unknown host and querying the knowledge base to determine if the unknown host is one of the known malicious hosts in the knowledge base. The method also includes outputting second information associated with the unknown host based upon the querying process.

In yet an alternative specific embodiment, the present invention provides a computer based method for populating a database to form a knowledge base of malicious host entities, e.g., malicious computing devices. The method includes determining a plurality of identity attributes, e.g., IP address, an IP range, ISP, country, ISP practice, or range class within the ISP. The method includes assigning a quality measure to each of the plurality the identity attributes. In a specific embodiment, the quality measure can be a quantitative entity to measure a strength or identity of an attribute. Of course, there can be other variations, modifications, and alternatives. The method includes collecting one or more evidences (e.g., specific country, specific IP address) from the unknown host. The method includes determining attribute fuzzy GUIDs for the unknown host by correlating the evidences to each of the plurality of identity attributes. The method also processes the attribute fuzzy GUID for each of the plurality of attributes to determine a host fuzzy GUID for the unknown host and stories the host fuzzy GUID for the unknown host in one or more memories of a database to form a knowledge base. In a specific embodiment, certain steps can be repeated for other unknown hosts to further populate the database to form the knowledge base.

Still further, the present invention provides a computer based system for populating a database to form a knowledge base of malicious host entities, the system comprising a machine readable memory or memories. Depending upon the embodiment, there are various computer codes, which carry out the functionality described herein. One or more codes are directed to determining a plurality of identity attributes. One or more codes are directed to assigning a quality measure to each of the plurality the identity attributes. One or more codes are directed to collecting one or more evidences from the unknown host. One or more codes are directed to determining attribute fuzzy GUIDs for the unknown host by correlating the evidences to each of the plurality of identity attributes. One or more codes is directed to processing the attribute fuzzy GUID for each of the plurality of attributes to determine a host fuzzy GUID for the unknown host. One or more codes is directed to storing the host fuzzy GUID for the unknown host in one or more memories of a database to form a knowledge base.

Various additional objects, features and advantages of the present invention can be more fully appreciated with reference to the detailed description and accompanying drawings that follow.

DESCRIPTION OF THE SPECIFIC EMBODIMENTS

The present invention generally relates to knowledge based techniques. More particularly, the invention provides a method and system for tracking machines on a network using fuzzy GUID (Globally Unique Identifier) technology in a knowledge base. Merely by way of example, the invention has been applied to a computer network environment. But it would be recognized that the invention has a much broader range of applicability. For example, the invention can be applied to a firewall, an intrusion detection/prevention system, a server, a content filter device, an anti-virus process, an anti-SPAM device, a web proxy content filter, spyware, web security process, electronic mail filter, any combination of these, and others.

In situations of malicious activity ("Act"), the goal of the malicious entity (Offender) is to inflict damage at minimum risk of detection or accountability. In the current realm of internet malicious activity, the offenders make use of anonymizing elements to achieve the latter. A broad range of options are available to the offender because of the current rate of compromised hosts ("Bot") on the internet.

In a typical scenario, an offender may 'rent' a network of bots (an "Army") to achieve a malicious goal. They may rent this from a hacker ("Intermediary") or some other person (or organization) that controls compromised hosts for profit. The bots work in concert to achieve the malicious gain, and, when the victims or enforcement attempt to track the origin, they invariably find that a compromised host was an unwilling participant in the crime. Because either the offender or the intermediary has control of each individual bot, they may deploy techniques to avoid detection (both on the host and by remote parties). On the local host, methods of hiding and avoiding detection from virus, Trojan and spyware products have been developed. Examples of such tools include rootkits that essentially hide all traces of the malicious components.

According to embodiments of the present invention, methods are provided for external detection and tracking of Bots in a scenario where the hosts may be attempting to hide its existence. In various embodiments, when a Bot is involved in an Act, the Bot often reveals its presence. It can be detected and traceable at that point in time. Occasionally some authors may assert "spoofing" can be used to avoid detection in this scenario—we may reject that. For most Acts, the Intermediary or Offender is seeking to achieve a result that is commercial in nature—requiring an extended transaction. Spoofing (by definition) terminates a full transaction as replies are not possible. In a specific embodiment of the present invention, the Bot is regarded to be fully exposed at the time of the Act.

Compromised hosts (Bots) are the key challenge for protection against malicious acts, and they are the primary entity that needs protection against. Essentially providing a "Threat Operating System" or "Threat Platform" they can launch a multitude of attacks/Acts. Acts are unpredictable to the degree similar to street crime, they may occur to a massive subset of internet users at any given time. Therefore the collection (or forensic recording) of malicious acts is so widely dispersed that only partial forensic information is available for any given event.

In an ideal scenario, full information of an Act would be available, but this is not possible. Quite often only small disparate pieces of information (such as IP address) are present. Practical tradeoffs such as performance and storage space affect the collection of forensic information.

Collection and reporting are analogous to interviewing witnesses at the scene of the crime and gathering forensic evidence. As discussed in provisional application No. 60/740,585 incorporated herein by reference, the 'witnesses' may have varying credibility and accuracy when providing evidence. In the case of Bots, they are essentially serial-offenders against whom evidence (or patterns of evidence) is gathered across various crime scenes. Collection of commonality is part of tracking the Bot, according to embodiments of the present invention.

Figure 1:
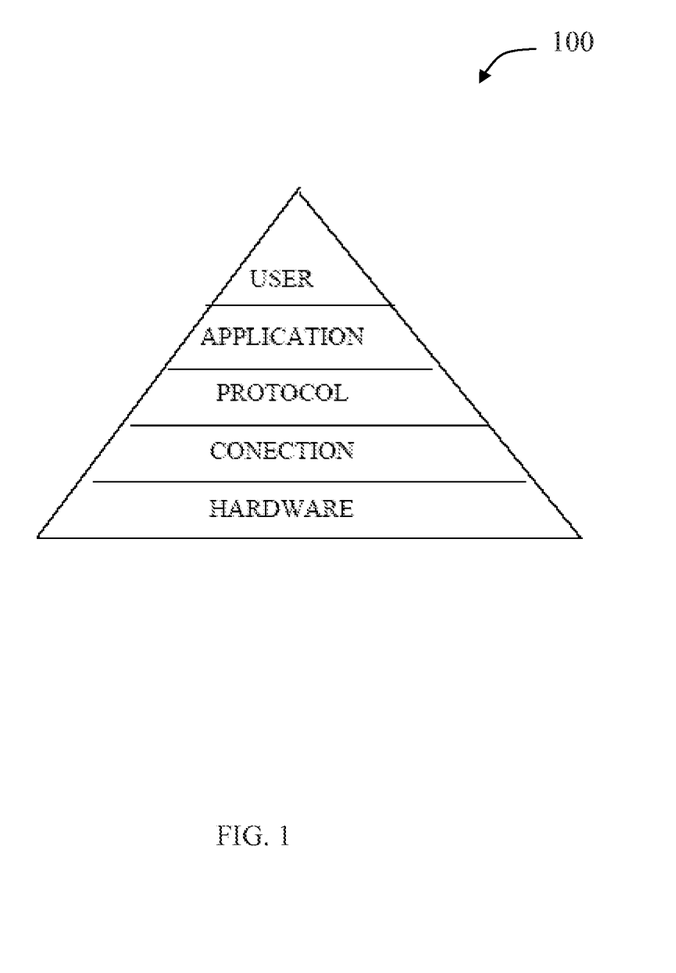
FIG. 1 is a simplified view diagram of layers in an internet transaction according to an embodiment of the present invention.

In any internet criminal transaction, there are a number of 'layers' that provide opportunity of entity tracking via the evidence available. FIG. 1 is a simplified diagram of layers in an internet transaction according to an embodiment of the present invention. This diagram is merely an example, which should not unduly limit the scope of the claims herein. One of ordinary skill in the art would recognize other variations, modifications, and alternatives. As shown, an internet transaction can be categorized into layers such as USER, APPLICATION, PROTOCOL, CONNECTION, and HARDWARE according to an embodiment of the invention. Each layer has characteristics of interest or identification attributes for the Bot.

In embodiments of the present invention, the USER layer can be either at the top of the pyramid as shown in FIG. 1 in a specific embodiment, or the bottom, depending on a point of view or the form/nature of the malicious activity. For illustrative purposes, we will use the ontological layering as shown in FIG. 1. According to an embodiment of the invention, some examples of each level are listed below:

USER: Skype id, from address, digital certificates, Biometric, Credit Card transactions

APPLICATION: IRC/CHAT, DKIM, VOIP,

PROTOCOL: port, IPv6

CONNECTION: IP address, URL, URN

HARDWARE: hardware profile, clock skew, Pc Serial Number (IPv6), nic.

Availability of attributes can be both a source of strength and weakness. Some attributes are so weak or so easily forged that they may be of limited use. For example, a "from address" in an email message for a USER often is of limited use. Other limitations associated with attributes include the following list.

Very difficult,

Time consuming,

Constitute an security breech themselves if allowed external to the organization Require special detection methods (or hardware) to obtain, and Limited by Privacy regulations.

At an extreme end of poor evidentiary quality is false positive and maliciously inaccurate evidence reports. In the provisional application 60/740,585, incorporated with this application, a reputation is associated with a quality of a reporting entity. In a specific embodiment of this application, a method is provided to allow acceptance of false positives in a context of other evidence. As an example of false positives at a specific Layer, at a HARDWARE level profiling of a specific Bot could provide false positive information. For example, a hardware profiler can create two wrong answers in its attempt to profile a connecting hardware which made two attempts at malicious acts. Another potential limitation of using HARDWARE layer attributes, such as clock skew, is the difficulty associated with the recognition of machines behind a portal. If a site is being served by a machine that can have multiple IP addresses, when the machine is detected, the other IP addresses can have reputations assigned to them aliases.

Conventional techniques may assume that a single detection is adequate, the equivalent of a DNA fingerprint that is not "spoofable" or forgeable at detection time. In theory, this panacea may be probable, but the inventor is not aware that any known method has been proven "un-spoofable". In the situation of Bots, where the hosts is compromised by code (often at the kernel level), the machine and its DNA are potentially under control of the Offender or Intermediary. For example, MAC address or clock-skew can be modifiable if kernel control has been surrendered. Multiple failings of this technique are discussed the in the public domain at these sites.

http://www.cloppert.org/blog/2005_03_01archive.html http://it.slashdot.org/iti05/03/04/1355253.shtrl?tid=172&tid-158

Spoofed attributes often degrade quality of evidentiary information, as illustrated in Table I below.

TABLE I

|  | Host attributed not spoofed | Host attributed spoofed |
| --- | --- | --- |
| Host Action -- Good | High evidentiary quality | Low evidentiary quality |
| Host Action -- Malicious | High evidentiary quality | Low evidentiary quality |

For this reason, collection of evidence at the hardware profiling level can be flawed and is therefore relegated to a partial contributor in tracking a Bot according to an embodiment of the present invention.

According to an embodiment of the invention, IP Address is required to be accurate at the time of the Act for the transaction to have desired effect. In some of the common deployment scenarios, an attempt by the Intermediary or Offender to control the IP address can be foiled. Such deployment scenarios may include the following.

1. The host is behind a NATed gateway, therefore changing the IP address on the local network has no effect on detection;
2. The host is provided with a DHCP lease that is under the control of the ISP or network provider; and
3. The forced switching of IP will negate the PC's capability to communicate with hosts not on the immediate subnet.

Therefore, if a detection method operates using IP address as an evidence, there is a strong evidentiary value at or immediately after the time of the Act. In a specific embodiment, the present method and system indicates that "Aging" is based on tracking Country and ISP. The term "Aging" is defined by one of ordinary skill in the art. If we are tracking the regularity of an ISP's DHCP leases, then we have a good control over non-spoofability. In a preferred embodiment, the method preferentially tracks ISP DHCP leases, which should provide control over non-spoofability among other network features. Of course, there can be other variations, modifications, and alternatives.

Other non-spoofable attributes may be identified over time that may supplant IP Address. One of the goals of IPv6 addresses this requirement and other initiatives where a hardware platform has a non-reputable identifier that cannot be subverted by kernel modifications. Any method of tracking identity should naturally include such non-spoofable attributes, but not entirely rely on it as many legacy internet applications will not be able to leverage the new identity. In a specific embodiment, the present method and system can also provide a GUID that does not require a retrofit of hardware but can deliver that capability to all internet applications. The inventor also recognizes that the system to be described in the sections below must be flexible enough to quickly implement these new attributes that emerge as an industry standard. Of course, there can be various alternatives, modifications, and variations.

Various embodiments of the invention are not limited to the use of a single specific attribute. In a specific embodiment, a method is provided to use multiple attributes to assign identity in an environment where identity is freely spoofable. In an embodiment, a portfolio of identity is utilized to create a "unified identity" that is intrinsically tied to reputation behavior. The term "unified identity" or "unified identifier" are known alternatively as GUID (globally unified identity or identifier).

According to a specific embodiment, a key concept is that: "A host's identity is the sum of its behaviors and not any one of its asserted identities.

By tracking multiple Attributes (Ids) these can then be cross referenced against each other to give a more complete picture of both the immediate threat as well as intelligence regarding activities and obfuscation patterns. In various embodiments, methods of cross-referencing or combining the portfolio of identities include but are not restricted to statistical, Bayesian, numerical algorithms, neural networks and other artificial intelligence methods. In a specific embodiment, a method is provided that uses algorithms to determine a Fuzzy Identity (or Fuzzy GUID).

For example, a host has been compromised and has become a "Bot". The host has performed a number of Acts that are malicious. In each of the cases, there is evidentiary information for the target application. For example, some of the evidences can include, but are not limited to, the following.

A user has received a phishing message;
A website has recorded some Google click-thru advertising;
A Website that was DDOSed managed to record some of the attacking hosts;
A purpose built security appliance at the DDOS site was able to capture some additional information about the Bot's hardware platform; and
An application sitting somewhere in the TCP stack which is computing the clock skew of current connections.

Figure 2:
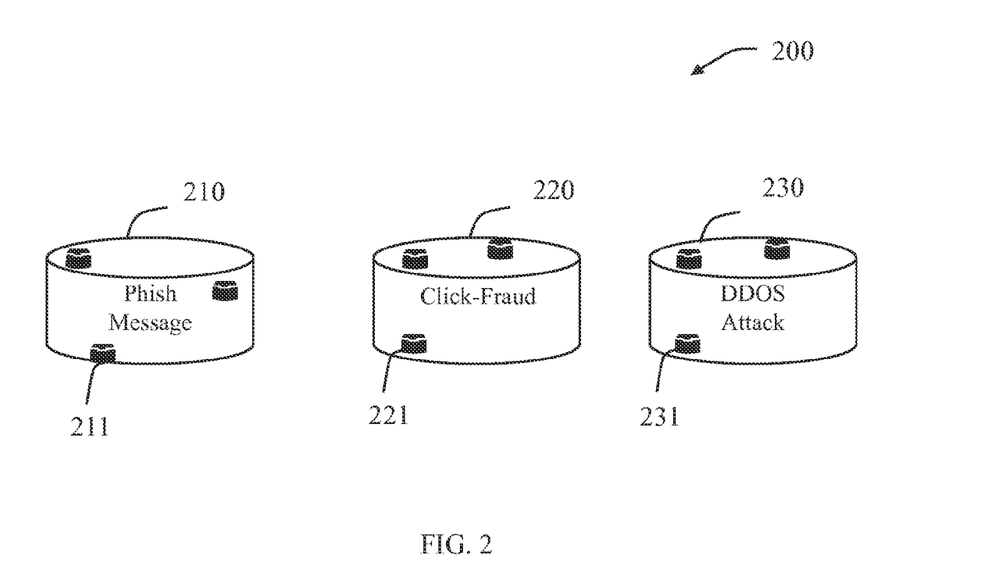
FIG. 2 is a simplified diagram of a method for evidence gathering according to an embodiment of the present invention.

FIG. 2 is a simplified diagram of a method for evidence gathering according to an embodiment of the present invention. This diagram is merely an example, which should not unduly limit the scope of the claims herein. One of ordinary skill in the art would recognize other variations, modifications, and alternatives. FIG. 2 includes a number of "security domain" containers such as domain 210 for phish messages, domain 220 for click-fraud, and domain 230 for DDOS attacks, etc. In a specific embodiment, the evidence gathered in each domain can be considered to be a collection of forensic data points. Merely for illustration purposes, each domain in FIG. 2 is shown to include certain data points. For example, domain 210 includes data point 211, domain 220 includes data point 221, domain 230 includes data point 221, etc. Depending upon the embodiments, a domain can have any number of data points. The number of forensic data points is not limited but will vary depending upon the security technology deployed at each collection point.

Figure 3:
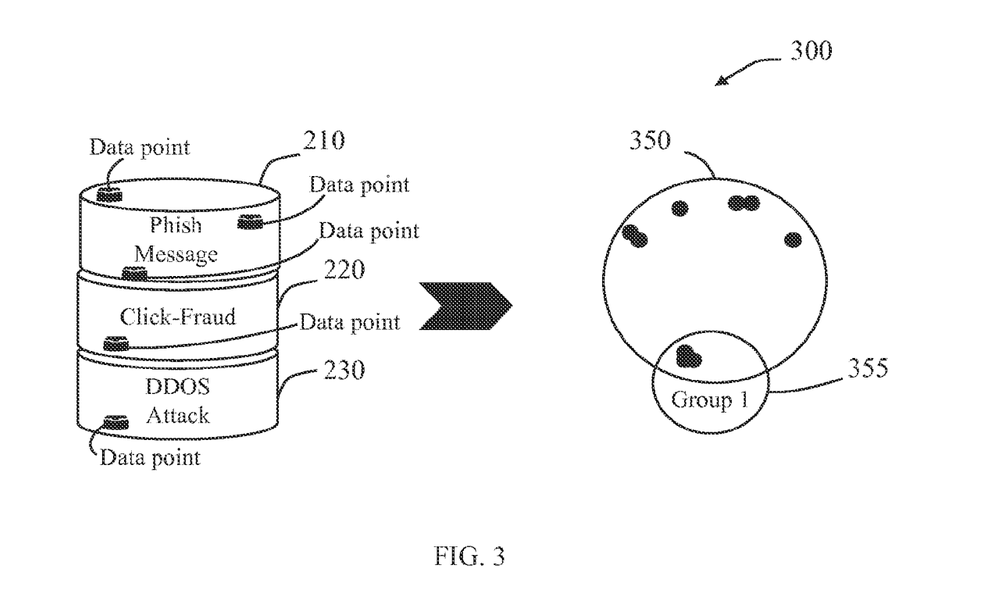
FIG. 3 is a simplified diagram of a method for evidence processing according to an embodiment of the present invention.

FIG. 3 is a simplified diagram of a method for evidence processing according to an embodiment of the present invention. This diagram is merely an example, which should not unduly limit the scope of the claims herein. One of ordinary skill in the art would recognize other variations, modifications, and alternatives. As shown, the correlation of commonality across security domains occurs where one or more common forensic evidence points are identical in two or more domains. This can be graphically represented in the following manner. The domains are "stacked" to give combined forensic collection, as shown by stacked domains 210, 220, and 230 in FIG. 3.

By rotating this diagram, and looking vertically through the "stack", some attributes (data points) appear common, as shown by 350. In this particular case the "Group 1" (355) is a set of attributes from the same class that correlate. For example, the attributes could include the following.

IP Address
   Primary attribute is the address
   Secondary attributes are:
      IP Range
      ISP
      Country
      ISP practices
      Range class within ISP
Machine Fingerprint
User ID
Application in use (e.g. Internet Explorer or Firefox)
Website referrer However, correlating weak data points/attributes is often a less productive activity according to a specific embodiment. For example, the following activities can be less productive in certain applications.

correlating on generic attribute such as Country will result in many matches correlating on attributes which are subvertible (machine fingerprint) on a trusted machine is acceptable but problematic on a compromised host correlating on a semi-subvertible attribute (IP address) within a sufficiently short time frame may be adequate. However, it cannot be trusted after a time period has elapsed.

According to a specific embodiment of the present invention, a Quality of an Attribute $Q_a$ can be defined as a functions of factors such as time, generic, accuracy, and subvertability, etc. For example, $$Q_a = F(\text{Time}, \text{Generic}, \text{Accuracy}, \text{Subvertability})$$

Statistically some GUIDs are stronger than others, for example, credit card ID. In the example in FIG. 3 above, the "Group 1" (355) is of sufficient quality to become a "pivot-point". The "pivot-point" is the commencement position from which to calculate the "Fuzzy GUID".

According to a specific embodiment, a Fuzzy GUID algorithm can generically be described as follows. Of course, a Fuzzy GUID method is not limited to this particular example.

For I=Max $Q_a$ down to Min $Q_a$:
   Correlate Evidence for this Qa
   For Max (Count $Q_{ai}$) down Min (Count $Q_{ai}$)
      Assign FG$_i$
   For FGia process all subsequent "a" to generate FGj
   FGj is the Fuzzy GUID for a given host/entity.

In a specific embodiment, in the context of tracking hosts on a network, in any given layer (for example, as described above with reference to FIG. 1), one entity (host) may have one or more passing GUIDs, e.g., IP, clock-skew, IP-range of ISP, hours of usage, sites visited, credit card ID, Digital Signature, that are combined to create a Fuzzy GUID. In an embodiment, this Fuzzy GUID can have the following properties.

an abstract concept/identifier;
unique to only one entity; or
not relational (can not divine the attributes from the GUID).

In an embodiment, GUIDs may be behavioral as well as identity. For example a sequence of activities or a particular protocol sequence may describe a host as effectively as a static characteristic of the entity/host being tracked in certain applications.

In an embodiment, the method allows for tracking a machine even if a host is compromised and the hacker has some control over changing the personality of the host. By providing a quality-driven approach to processing, the cost forensic evidence reduces to the following generic equation:

$$T(x,y) = \pounds Y \operatorname{Log} X$$

where X=amount of evidence attributes, and
Y=quality of attributes

According to an specific embodiment of the invention, a method is provided to use active scanning and profiling of an active click-fraud/spamming machine and tie it to an IP address until such time that it is seen to move from that address. If this is a dynamic IP range, this will enable a system to quickly age/drop that IP from the system's list. In a specific embodiment, connections can then be accepted or dropped quickly according to IP without need to try and profile a machine (time consuming and problematic for false positives). In additions, this accelerates our ability to profile behaviors in ISP ranges and various automated conditions of the hosting network (DHCP lease time policies etc) according to an embodiment of the present invention.

According to a specific embodiment of the present invention, a method for tracking machines on a network of computers can be briefly outlined below.

1. Identify a malicious host coupled to the network of computers;
2. Determine a first IP address and one or more attributes;
3. Classify the malicious host to be in a determined state;
4. Change the first IP address to a second IP address;
5. Identify an unknown host during the second time period;
6. Process the second IP address and the one or more attributes; and
7. Determine if the unknown host is the malicious host.

The above sequence of steps provides a method for tracking machines on a network of computers according to an embodiment of the present invention. As shown, the method uses a combination of steps including a way of using an IP address along with other attributes to determine whether an unknown host is a malicious host. Other alternatives can also be provided where steps are added, one or more steps are removed, or one or more steps are provided in a different sequence without departing from the scope of the claims herein. Further details of the present method can be found throughout the present specification and more particularly below.

Figure 4:
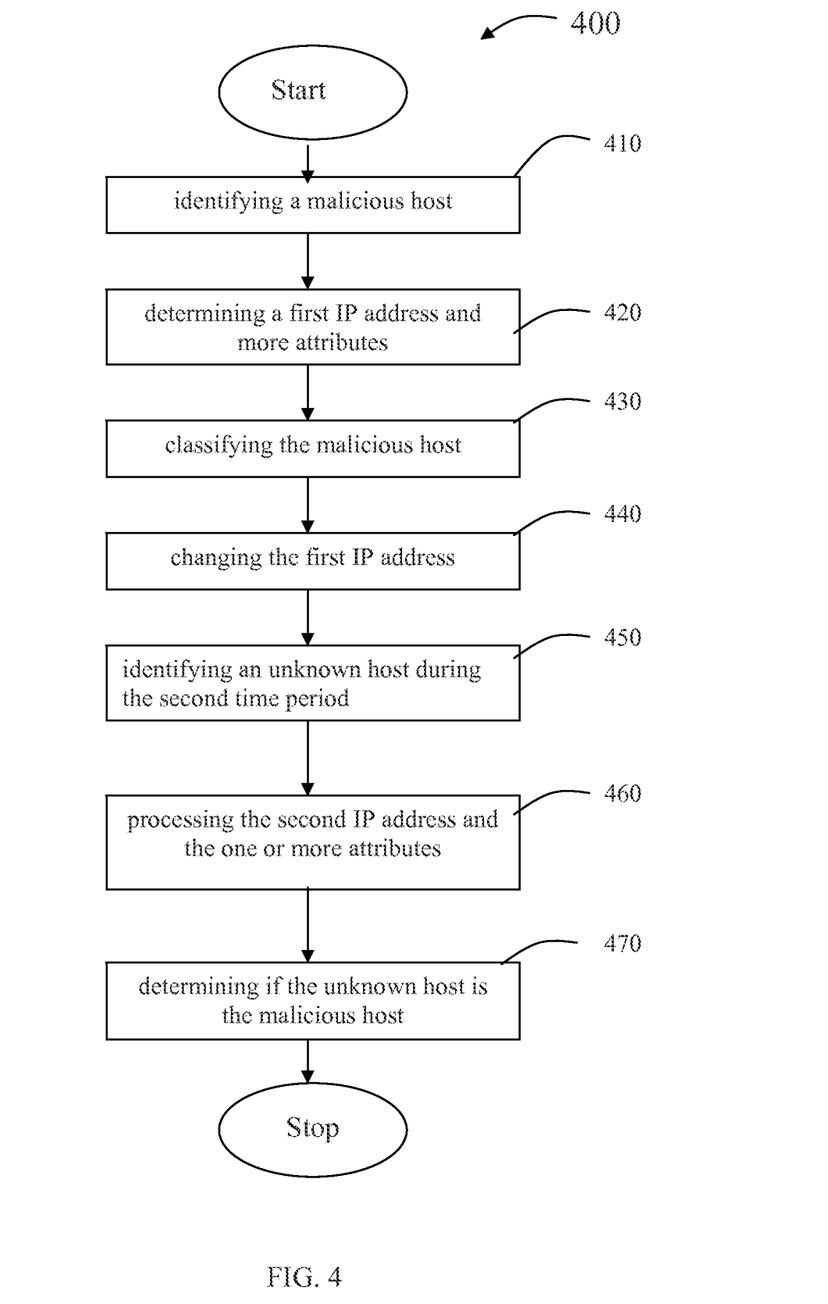
FIG. 4 is a simplified flow diagram of a method for tracking machines on a network of computers according to an embodiment of the present invention.

FIG. 4 is a simplified flow diagram for a method 400 for tracking machines on a network of computers according to an embodiment of the present invention. This diagram is merely an example, which should not unduly limit the scope of the claims herein. One of ordinary skill in the art would recognize other variations, modifications, and alternatives. As shown, the method includes identifying a malicious host coupled to the network of computers, step 410. In a preferred embodiment, the method (step 420) includes determining a first IP address and one or more attributes associated with the malicious host during a first time period. In step 430, the method classifies the malicious host to be in a determined state. In an embodiment, the method includes changing the first IP address to a second IP address during a second time period to cause the malicious host to be in a latent state, step 440. The method includes (step 450) identifying an unknown host during the second time period. In an embodiment, the unknown host is associated with the second IP address and one or more attributes. The method also includes (step 460) processing the second IP address and the one or more attributes of the unknown host with the first IP address and the one or more attributes of the malicious host. In step 470 the method determines if the unknown host is the malicious host. In a specific embodiment, the one or more attributes includes an IP range, ISP, country, ISP practice, or range class within the ISP. In an embodiment, the network of computers includes a world wide network of computers. In a specific embodiment, the method also includes determining if the unknown host is a different machine than the malicious host.

The above sequence of steps provides a method for tracking machines on a network of computers according to an embodiment of the present invention. As shown, the method uses a combination of steps including a way of using an IP address along with other attributes to determine whether an unknown host is a malicious host. Other alternatives can also be provided where steps are added, one or more steps are removed, or one or more steps are provided in a different sequence without departing from the scope of the claims herein.

According to another specific embodiment of the present invention, a method for querying a knowledgebase of malicious hosts according to an embodiment of the present invention can be briefly outlined below.

1. Provide a network of computers;
2. Query a knowledge base;
3. Receive first information associated with an unknown host;
4. Query the knowledge base; and
5. Output second information associated with the unknown host.

The above sequence of steps provides for querying a knowledgebase of malicious hosts according to an embodiment of the present invention. As shown, the method uses a combination of steps including a way of querying a knowledgebase of malicious hosts to obtain information about an unknown host. Other alternatives can also be provided where steps are added, one or more steps are removed, or one or more steps are provided in a different sequence without departing from the scope of the claims herein. Further details of the present method can be found throughout the present specification and more particularly below.

Figure 5:
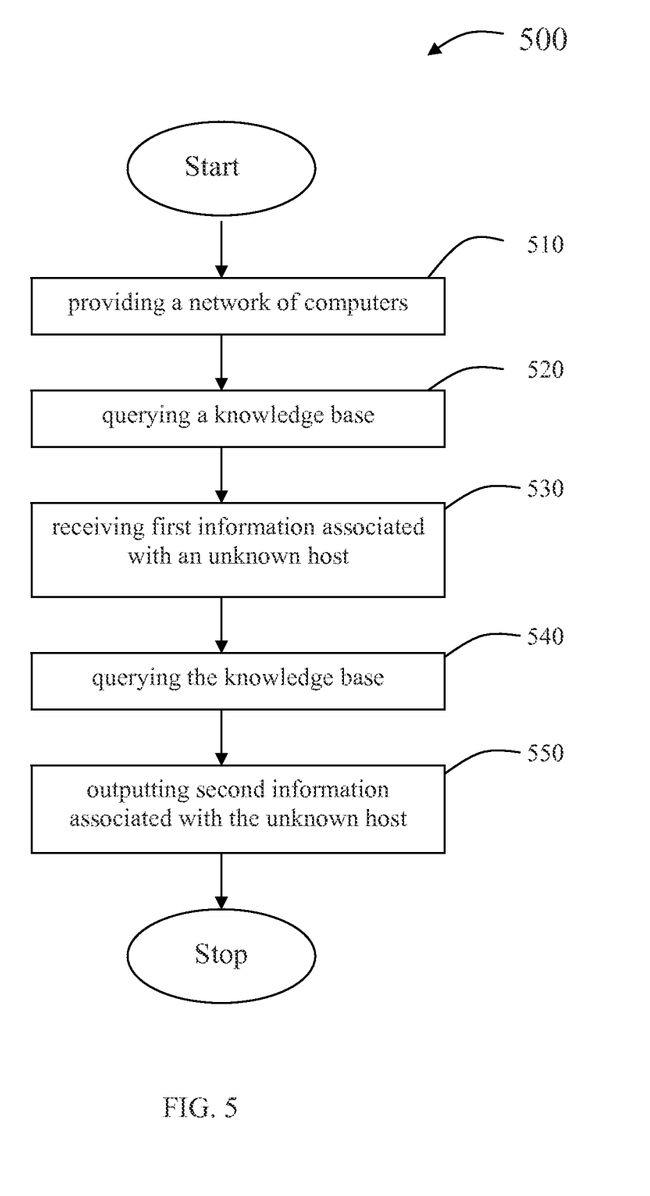
FIG. 5 is a simplified flow diagram of a method for querying a knowledgebase of malicious hosts according to an embodiment of the present invention

FIG. 5 is a simplified flow diagram of a method 500 for querying a knowledgebase of malicious hosts according to an embodiment of the present invention. This diagram is merely an example, which should not unduly limit the scope of the claims herein. One of ordinary skill in the art would recognize other variations, modifications, and alternatives. As shown, the method includes providing a network of computers, step 510. The network of computers includes a plurality of unknown malicious host machines. The malicious host machines can be disposed throughout the network of computers. In an embodiment, the network of computers includes a world wide network of computers. In a specific embodiment, the method includes querying a knowledge base which includes a plurality of known malicious hosts, step 520. In an embodiment, the plurality of known malicious hosts are numbered from 1 through N, where N is an integer greater than 1. In an embodiment, the knowledge base is coupled to the network of computers. In an embodiment, the method includes (step 530) receiving first information associated with an unknown host from the network identifying an unknown host. In step 540, the method queries the knowledge base to determine if the unknown host is one of the known malicious hosts in the knowledge base. In an embodiment the method outputs second information associated with the unknown host based upon the querying process, step 550.

In a specific embodiment, N is an integer three million or more. Depending upon the embodiment, N can be a number smaller than three million. In another embodiment, if the unknown host is one of the known malicious hosts, the method updates a filter to block access of the malicious host to one or more segments of the network of computers. In a specific embodiment, the method of claim further includes outputting an alert to signify the malicious host, if the unknown host is determined to be one of the malicious hosts.

The above sequence of steps provides a method for querying a knowledgebase of malicious hosts according to an embodiment of the present invention. As shown, the method uses a combination of steps including a way of querying a knowledgebase of malicious hosts to obtain information about an unknown host. Other alternatives can also be provided where steps are added, one or more steps are removed, or one or more steps are provided in a different sequence without departing from the scope of the claims herein. Further details of the present method can be found throughout the present specification and more particularly below.

According to another specific embodiment of the present invention, a computer based method for populating a database to form a knowledge base of malicious host entities can be briefly outlined below.

1. Determine a plurality of identity attributes;
2. Assign a quality measure to each of the plurality the identity attributes;
3. Collect one or more evidences from the unknown host;
4. Determine attribute fuzzy GUIDs for the unknown host;
5. Process the attribute fuzzy GUIDs to determine a host fuzzy GUID and
6. Store the host fuzzy GUID in a database.

The above sequence of steps provides a power saving method for a computer based method for populating a database to form a knowledge base of malicious host entities according to an embodiment of the present invention. As shown, the method uses a combination of steps including a way of determining fuzzy GUIDs to identify unknown host. Other alternatives can also be provided where steps are added, one or more steps are removed, or one or more steps are provided in a different sequence without departing from the scope of the claims herein. Further details of the present method can be found throughout the present specification and more particularly below.

Figure 6:
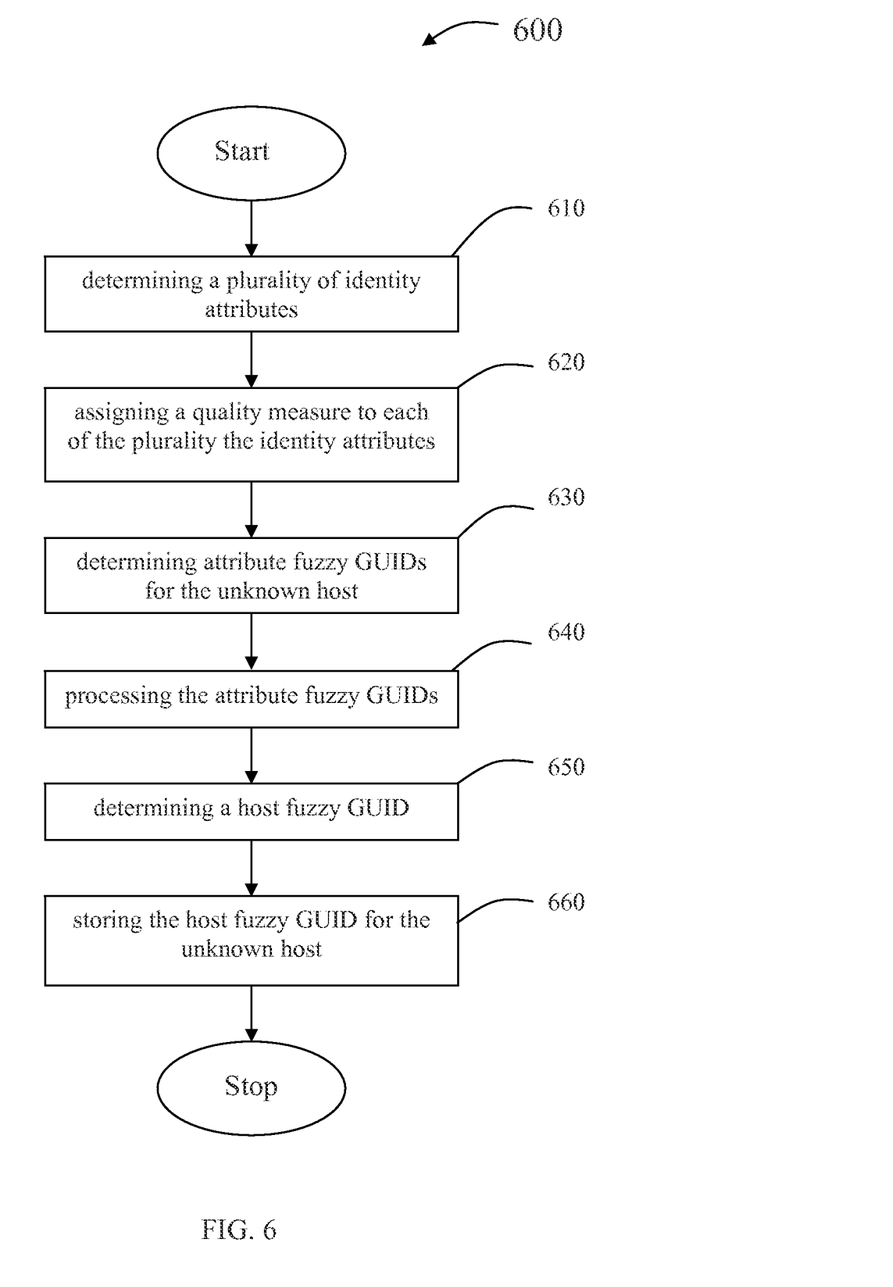
FIG. 6 is a simplified flow diagram of a computer based method for populating a database to form a knowledge base of malicious host entities according to an embodiment of the present invention.

FIG. 6 is a simplified flow diagram 600 of a computer based method for populating a database to form a knowledge base of malicious host entities according to an embodiment of the present invention. This diagram is merely an example, which should not unduly limit the scope of the claims herein. One of ordinary skill in the art would recognize other variations, modifications, and alternatives. As shown, the method includes determining a plurality of identity attributes step 610. In a specific embodiment, the attributes include an IP range, ISP, country, ISP practice, or range class within the ISP. The method includes, in step 620, assigning a quality measure to each of the plurality the identity attributes. In step 630, the method collects one or more evidences from the unknown host. In an embodiment, the method includes determining attribute fuzzy GUIDs for the unknown host by correlating the evidences to each of the plurality of identity attributes, step 640. In an embodiment, an attribute fuzzy GUID is determined for each of the attributes. In a specific embodiment, the method processes the attribute fuzzy GUID for each of the plurality of attributes to determine a host fuzzy GUID for the unknown host, step 650. In a specific embodiment, the method includes selecting a second plurality of identify attributes characterized by quality measures higher than a predetermined value. Depending upon the applications, identity attributes having high quality measures usually provide more useful information. Therefore, by concentrating on these higher quality attributes, the processing cost can be reduced. The method also includes storing the host fuzzy GUID for the unknown host in one or more memories of a database to form a knowledge base, step 650.

The above sequence of steps provides a computer based method for populating a database to form a knowledge base of malicious host entities according to an embodiment of the present invention. As shown, the method uses a combination of steps including a way of determining fuzzy GUIDs to identify unknown host. Other alternatives can also be provided where steps are added, one or more steps are removed, or one or more steps are provided in a different sequence without departing from the scope of the claims herein. Further details of these other devices using the present method can be found throughout the present specification and more particularly below.

Figure 7:
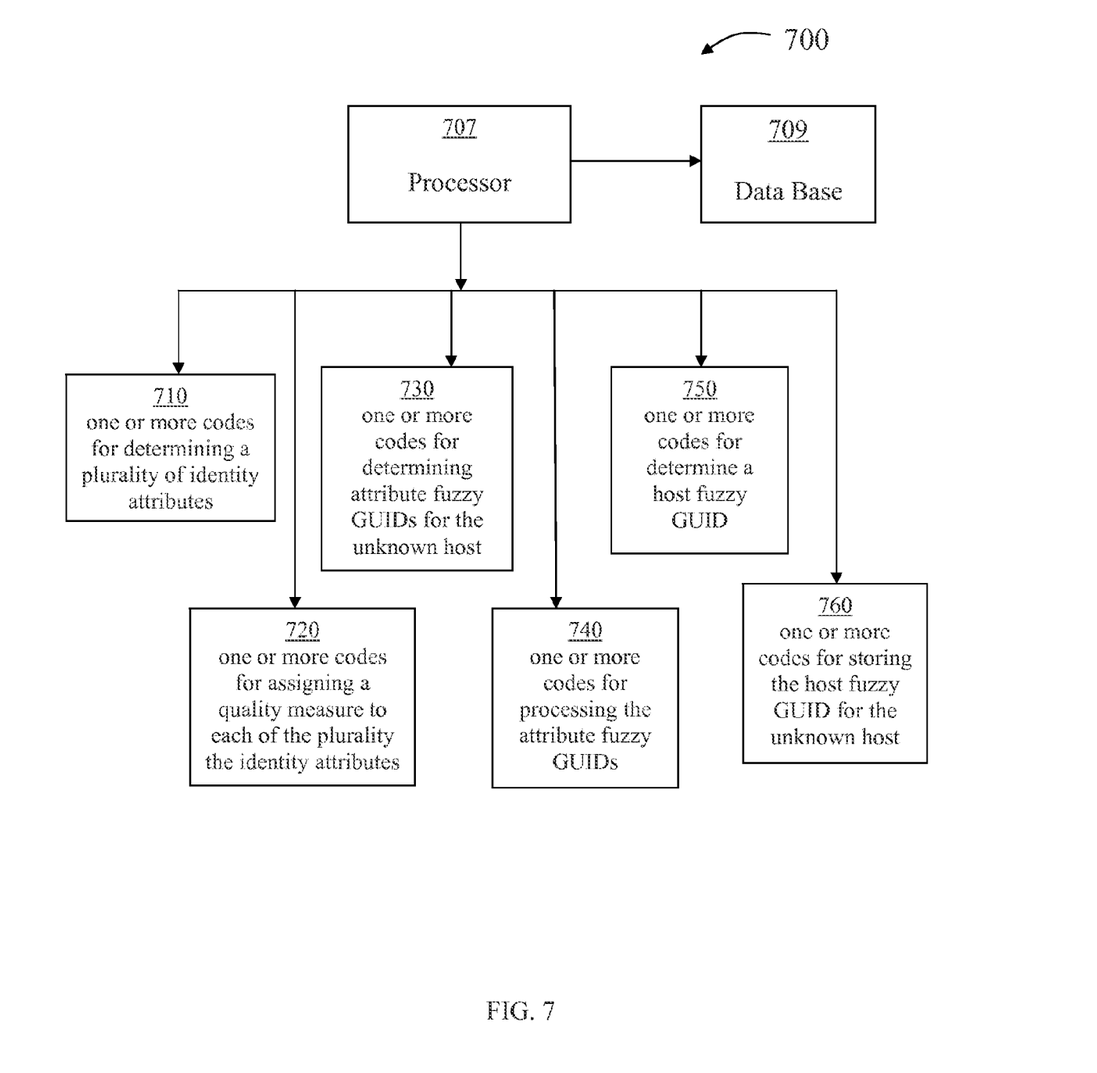
FIG. 7 is a simplified block diagram of a computer based system for populating a database to form a knowledge base of malicious host entities.

FIG. 7 is a simplified block diagram of a computer based system 700 for populating a database to form a knowledge base of malicious host entities. This diagram is merely an example, which should not unduly limit the scope of the claims herein. One of ordinary skill in the art would recognize other variations, modifications, and alternatives. As shown, the system includes a processor 707 and database 708, among other components not shown in FIG. 7. In a specific embodiment, the system includes a machine readable memory or memories. The memory or memories includes a number of blocks for various functions. For example, block 710 includes one or more codes directed to determining a plurality of identity attributes. Block 720 includes one or more codes directed to assigning a quality measure to each of the plurality the identity attributes. Block 730 includes one or more codes directed to collecting one or more evidences from the unknown host. Block 740 includes one or more codes directed to determining attribute fuzzy GUIDs for the unknown host by correlating the evidences to each of the plurality of identity attributes. In an embodiment, an attribute fuzzy GUID is determined for each of the attributes. Block 750 includes one or more codes directed to processing the attribute fuzzy GUIDs for each of the plurality of attributes to determine a host fuzzy GUID for the unknown host. Block 760 includes one or more codes directed to storing the host fuzzy GUID for the unknown host in one or more memories of a database to form a knowledge base.

In a specific embodiment, the unknown host is one of a plurality of computing devices in a world wide network of computers. In an embodiment, the one or more codes directed to storing are an executable code. In certain embodiments, the knowledge base comprises a plurality of malicious host information. In an embodiment, the host fuzzy GUID comprises an identifier. For example, the identifier is an IP address in a specific embodiment. Of course, there can be other variations, modifications, and alternatives.

Figure 8:
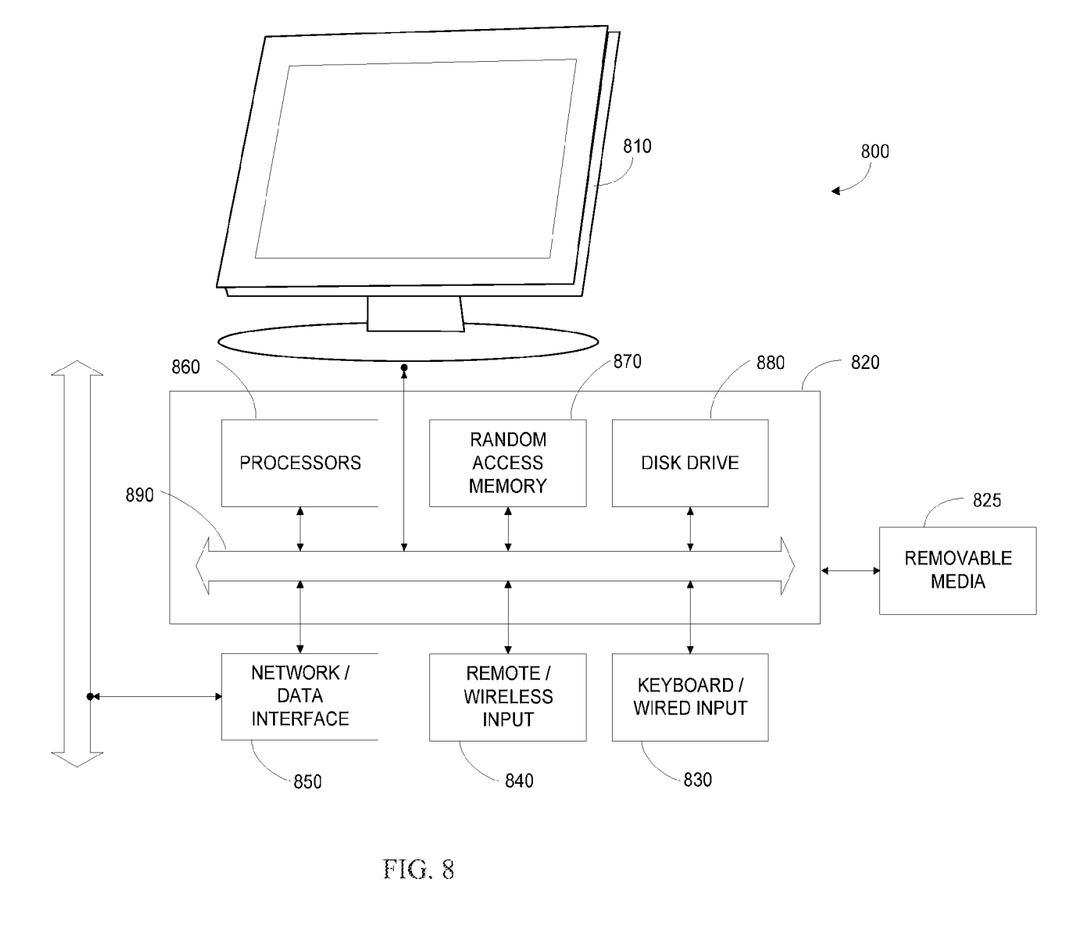
FIG. 8 is a simplified block diagram of a computer system according to an embodiment of the present invention.

FIG. 8 is a simplified block diagram of a computer system 800 according to an embodiment of the present invention. In the present embodiment, computer system 800 typically includes a monitor 810, computer 820, a keyboard 830, a user input device 840, computer interfaces 850, and the like.

In the present embodiment, user input device 840 is typically embodied as a computer mouse, a trackball, a track pad, a joystick, wireless remote, drawing tablet, voice command system, eye tracking system, and the like. User input device 840 typically allows a user to select objects, icons, text and the like that appear on the monitor 810 via a command such as a click of a button or the like.

Embodiments of computer interfaces 850 typically include an Ethernet card, a modem (telephone, satellite, cable, ISDN), (asynchronous) digital subscriber line (DSL) unit, FireWire interface, USB interface, and the like. For example, computer interfaces 150 may be coupled to a computer network, to a FireWire bus, or the like. In other embodiments, computer interfaces 850 may be physically integrated on the motherboard of computer 120, may be a software program, such as soft DSL, or the like.

In various embodiments, computer 820 typically includes familiar computer components such as a processor 860, and memory storage devices, such as a random access memory (RAM) 870, disk drives 880, and system bus 890 interconnecting the above components.

In one embodiment, computer 820 includes one or more microprocessors from Intel. Further, in the present embodiment, computer 820 typically includes a Windows-based operating system from Microsoft Corporation.

RAM 870 and disk drive 880 are examples of tangible media configured to store data such as data sources, embodiments of thematic extraction engines, thematic indices, application programs, and the like. The data stored may be in the form of computer-readable code, human-readable code, or the like. Other types of tangible media include internal storage or distribution media, such as floppy disks, removable hard disks, optical storage media such as CD-ROMS, DVDs, holographic memory, and bar codes, semiconductor memories such as flash memories, read-only-memories (ROMS), battery-backed volatile memories, networked storage devices, and the like.

In the present embodiment, computer system 800 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 8 is representative of a computer system capable of embodying the present invention. It will be readily apparent to one of ordinary skill in the art that many other hardware and software configurations are suitable for use with the present invention. For example, the computer may be an end-user desktop or portable; a network storage server configured in a rack-mounted or stand-alone configuration; a centralized server; or the like. Additionally, the computer may be a series of networked computers. Further, the use of microprocessors such as the Pentium™ or Itanium™ microprocessors; Opteron™ or AthlonXP™ microprocessors from Advanced Micro Devices, Inc; G4 or G5 microprocessors from IBM; and the like are contemplated. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board (e.g. graphics processor unit).

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method tracking machines on a network of computers, the method comprising:
   identifying a malicious host coupled to the network of computers;
   determining a first IP address and one or more first attributes associated with the malicious host during a first time period, wherein the one or more first attributes includes first behavior information associated with the malicious host during the first time period;
   classifying the malicious host to be in a determined state;
   determining that the malicious host is in a latent state during a second time periods;
   identifying an unknown host during the second time period when the malicious host is in the latent state, the unknown host being associated with a second IP address and one or more second attributes, wherein the one or more second attributes includes second behavior information associated with the unknown host during the second time period;
   processing the second IP address and the one or more second attributes of the unknown host with the first IP address and the one or more first attributes of the malicious host; and
   determining if the unknown host is the malicious host based on results of the processing of the second IP address and the one or more second attributes of the unknown host with the first IP address and the one or more first attributes of the malicious host.

2. The method of claim 1 wherein the one or more attributes comprises an IP range, ISP, country, ISP practice, or range class within the ISP.

3. The method of claim 1 wherein the network of computers includes a world wide network of computers.

4. The method of claim 1 further comprising determining if the unknown host is a different machine than the malicious host.

5. A method for querying a knowledgebase of malicious hosts numbered from 1 through N, the method comprising:
   providing a network of computers, the network of computers including a plurality of unknown malicious host machines, the malicious host machines being disposed throughout the network of computers, the network of computers including a world wide network of computers;
   querying a knowledge base including a plurality of known malicious hosts, the plurality of known malicious hosts being numbered from 1 through N, where N is an integer greater than 1, the knowledge base being coupled to the network of computers;
   receiving first information associated with an unknown host from the network wherein the first information includes behavior information associated with the unknown host;
   identifying the unknown host based on the first information;
   querying the knowledge base to determine if the unknown host is one of the known malicious hosts in the knowledge base using the first information including the behavior information associated with the unknown host; and
   outputting second information associated with the unknown host based upon the querying process.

6. The method of claim 5 wherein N is an integer three million or more.

7. The method of claim 5 further comprising, if the unknown host is one of the known malicious hosts, updating a filter to block access of the malicious host to one or more segments of the network of computers.

8. The method of claim 5 further comprising outputting an alert to signify the malicious host, if the unknown host is determined to be one of the malicious hosts.

9. The method of claim 4 wherein the identifying of the unknown host further comprising:
   determining a plurality of identity attributes;
   assigning a quality measure to each of the plurality the identity attributes;
   collecting one or more evidences from the unknown host;
   determining an attribute fuzzy GUID for each of the plurality of identity attributes for the unknown host, the attribute fuzzy GUID being associated with the evidences;
   processing the attribute fuzzy GUID for each of the plurality of attributes to determine a host fuzzy GUID for the unknown host.

10. The method of claim 9 wherein the one or more attributes comprises an IP range, ISP, country, ISP practice, or range class within the ISP.

11. The method of claim 9 further comprising selecting a second plurality of identity attributes characterized by quality measures higher than a predetermined value.

12. A computer based method for populating a database to form a knowledge base of malicious host entities, the method comprising:
   determining a plurality of identity attributes;
   assigning a quality measure to each of the plurality of identity attributes;
   collecting one or more evidences from the unknown host, wherein the one or more evidences includes behavior information associated with the unknown host;
   determining an attribute fuzzy GUID for each of the plurality of identity attributes for the unknown host based on the one or more evidences, wherein the attribute fuzzy GUID for each of the plurality of identity attributes including a first attribute fuzzy GUID determined based on the behavior information;
   processing the attribute fuzzy GUID for each of the plurality of attributes to determine a host fuzzy GUID for the unknown host; and
   storing the host fuzzy GUID for the unknown host in one or more memories of a database to form a knowledge base.

13. The method of claim 12 wherein the one or more attributes comprises an IP range, ISP, country, ISP practice, or range class within the ISP.

14. The method of claim 12 further comprising selecting a second plurality of identity attributes characterized by quality measures higher than a predetermined value.

15. A computer based system for populating a database to form a knowledge base of malicious host entities, the system comprising a machine readable memory or memories, the memory or memories comprising:
   one or more codes directed to determining a plurality of identity attributes;
   one or more codes directed to assigning a quality measure to each of the plurality the identity attributes;
   one or more codes directed to collecting one or more evidences from the unknown host, wherein the one or more evidences includes behavior information associated with the unknown host;
   one or more codes directed to determining an attribute fuzzy GUID for each of the plurality of identity attributes for the unknown host based on the one or more evidences, wherein the attribute fuzzy GUID for each of the plurality of identity attributes includes a first attribute fuzzy GUID determined based on the behavior information;

one or more codes directed to processing the attribute fuzzy GUID for each of the plurality of attributes to determine a host fuzzy GUID for the unknown host; and one or more codes directed to storing the host fuzzy GUID for the unknown host in one or more memories of a database to form a knowledge base.

16. The system of claim 15 wherein the unknown host is one of a plurality of computing devices in a world wide network of computers.

17. The system of claim 15 wherein the one or more codes directed to storing is an executable code.

18. The system of claim 15 wherein the knowledge base comprises a plurality of malicious host information.

19. The system of claim 15 wherein the host fuzzy GUID comprises an identifier.

20. The system of claim 19 wherein the identifier is an IP address.

* * * * *